(12) United States Patent
Nakamura et al.

(10) Patent No.: US 9,103,296 B2
(45) Date of Patent: Aug. 11, 2015

(54) TRACTION CONTROL SYSTEM FOR VEHICLE

(71) Applicant: HONDA MOTOR CO., LTD., Tokyo (JP)

(72) Inventors: Masanori Nakamura, Wako (JP); Takeru Abe, Wako (JP); Tatsuro Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 13/928,534

(22) Filed: Jun. 27, 2013

(65) Prior Publication Data

US 2014/0000556 A1    Jan. 2, 2014

(30) Foreign Application Priority Data

Jun. 29, 2012   (JP) .................. 2012-147695

(51) Int. Cl.

| | | |
|---|---|---|
| *F02D 41/12* | (2006.01) | |
| *F02D 41/30* | (2006.01) | |
| *B60W 30/18* | (2012.01) | |
| *F02D 41/00* | (2006.01) | |
| *B60K 28/16* | (2006.01) | |
| *B60T 8/175* | (2006.01) | |
| *F02D 41/14* | (2006.01) | |

(52) U.S. Cl.
CPC ......... *F02D 41/30* (2013.01); *B60W 30/18172* (2013.01); *F02D 41/0087* (2013.01); *F02D 41/123* (2013.01); *B60K 28/16* (2013.01); *B60T 8/175* (2013.01); *F02D 2041/1412* (2013.01); *F02D 2200/1004* (2013.01); *F02D 2200/1006* (2013.01); *F02D 2250/18* (2013.01)

(58) Field of Classification Search
CPC ... F02D 41/0087; F02D 41/123; B60K 28/16; B60T 8/175
USPC ........... 123/325, 332, 198 F, 481; 701/82, 84, 701/86, 112
See application file for complete search history.

(56) References Cited

U.S. PATENT DOCUMENTS

| | | | | |
|---|---|---|---|---|
| 5,379,222 A | * | 1/1995 | Anan et al. ...................... 701/91 |
| 5,400,865 A | * | 3/1995 | Togai et al. ................... 180/197 |
| 5,472,061 A | * | 12/1995 | Shiraishi et al. .............. 180/197 |
| 6,141,618 A | * | 10/2000 | Yamashita et al. .............. 701/84 |

FOREIGN PATENT DOCUMENTS

JP    06-146944 A    5/1994

* cited by examiner

*Primary Examiner* — Mahmoud Gimie
(74) *Attorney, Agent, or Firm* — Squire Patton Boggs (US) LLP

(57) ABSTRACT

A vehicle includes an engine, a slip ratio calculating unit, a target torque calculating unit, a fuel cut pattern determining unit, and a fuel cut control unit. The vehicle also includes a traction control system which includes an average output torque predicting unit and a fuel cut pattern correcting unit configured to correct the remaining fuel cut pattern during a unit section by judging the overage and shortage of generation of an output torque of the engine by comparison of the average output torque and the target torque.

10 Claims, 6 Drawing Sheets

| CYLINDER # | 4 | 1 | 3 | 2 | 4 | 1 | 3 | 2 | 4 | 1 | 3 | 2 | 4 | 1 | 3 | 2 |
|---|---|---|---|---|---|---|---|---|---|---|---|---|---|---|---|---|

| FUEL CUT PATTERN | FUEL CUT ORDER | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | ● | ○ | ○ | ○ | ○ | ○ | ○ | ○ | ○ | ○ | ○ | ○ | ○ | ○ | ○ | ○ |
| 2 | ● | ○ | ○ | ○ | ● | ○ | ○ | ○ | ○ | ○ | ○ | ○ | ○ | ○ | ○ | ○ |
| 3 | ● | ○ | ○ | ○ | ● | ○ | ○ | ○ | ● | ○ | ○ | ○ | ○ | ○ | ○ | ○ |
| 4 | ● | ○ | ○ | ○ | ● | ○ | ○ | ○ | ● | ○ | ○ | ○ | ● | ○ | ○ | ○ |
| 5 | ● | ○ | ● | ○ | ● | ○ | ○ | ○ | ● | ○ | ○ | ● | ○ | ○ | ○ | ○ |
| 6 | ● | ○ | ● | ○ | ● | ○ | ● | ○ | ● | ○ | ○ | ● | ○ | ○ | ○ | ○ |
| 7 | ● | ○ | ● | ○ | ● | ○ | ● | ○ | ● | ○ | ● | ○ | ● | ○ | ○ | ○ |
| 8 | ● | ○ | ● | ○ | ● | ○ | ● | ○ | ● | ○ | ● | ○ | ● | ○ | ● | ○ |
| 9 | ● | ● | ○ | ● | ○ | ● | ○ | ● | ○ | ● | ○ | ● | ○ | ● | ● | ○ |
| 10 | ● | ● | ● | ○ | ● | ● | ○ | ● | ○ | ● | ○ | ● | ○ | ● | ● | ○ |
| 11 | ● | ● | ● | ○ | ● | ● | ○ | ● | ● | ○ | ● | ● | ○ | ● | ● | ○ |
| 12 | ● | ● | ● | ○ | ● | ● | ● | ○ | ● | ● | ○ | ● | ● | ● | ● | ○ |
| 13 | ● | ● | ● | ● | ● | ● | ● | ○ | ● | ● | ● | ○ | ● | ● | ● | ○ |
| 14 | ● | ● | ● | ● | ● | ● | ● | ● | ● | ● | ● | ● | ○ | ● | ● | ○ |
| 15 | ● | ● | ● | ● | ● | ● | ● | ● | ● | ● | ● | ● | ● | ● | ● | ○ |

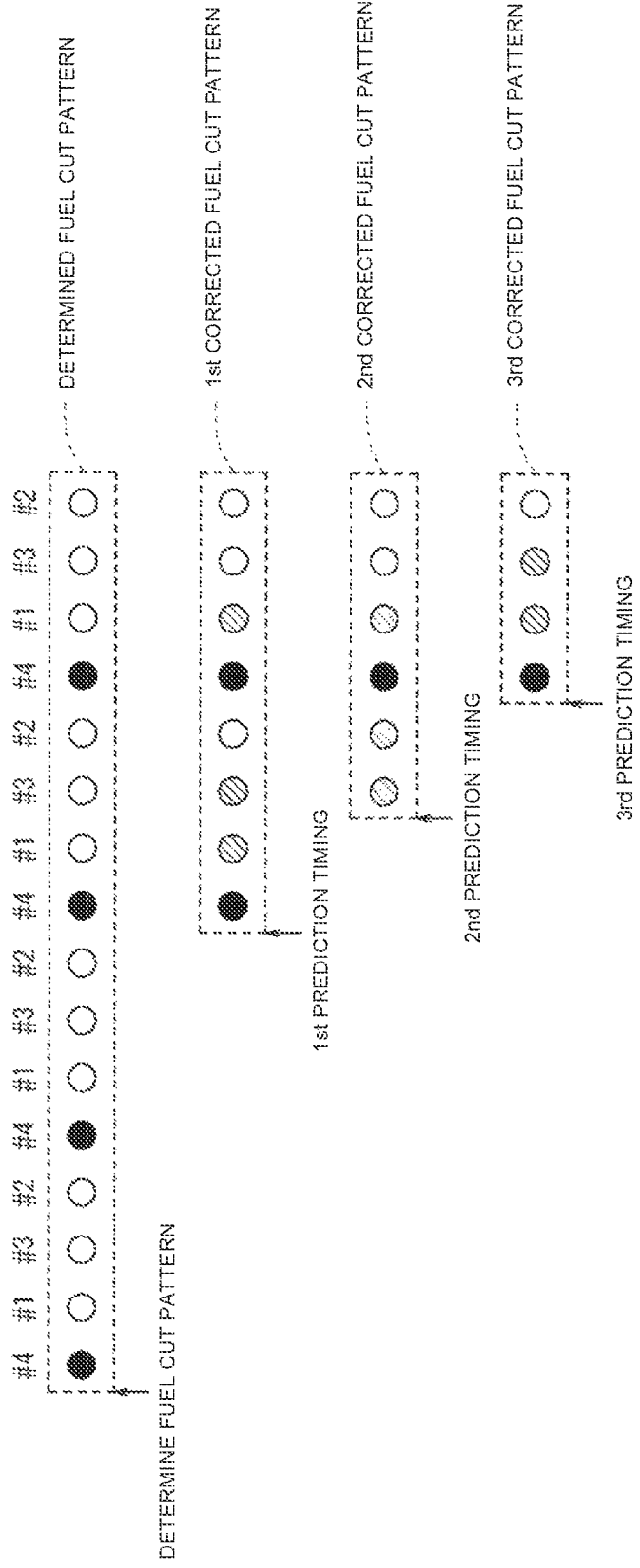

TRACTION CONTROL SYSTEM FOR VEHICLE

BACKGROUND

1. Field

The present invention relates to a traction control system for a vehicle which reduces the driving force depending on the slip ratio of the front and rear wheels.

2. Description of the Related Art

Patent Document 1 (Japanese Laid-Open Patent Publication No. H6-146944) describes that the output of an engine is generated in such a way as to determine an output reduction request signal depending on the size of the slip condition of driving wheels and to perform a fuel cut based on a fuel cut pattern depending on the output reduction request signal. The number of cylinders in which the fuel supply is cut is different by fuel cut pattern, and the requested number of fuel cut cylinders for the injection calculation, which is executed in each injection process of each of the cylinders, is updated.

However, when the fuel cut pattern is updated, the initial fuel cut pattern is forced to end in the middle of a unit section, and the fuel cut pattern which has the unit section of the same length newly starts. Therefore, the unit section of the fuel cut pattern is divided into small sections, which thereby deteriorates the convergence of the driving slip.

SUMMARY

Therefore, it is an object of the present invention to provide a traction control system for a vehicle which improves the convergence of the driving slip.

A first embodiment of the present invention is a vehicle comprising an engine which has a plurality of cylinders. A slip ratio calculating unit is configured to calculate an actual slip ratio of front and rear wheels. A target torque calculating unit is configured to calculate a target torque of the engine based on the actual slip ratio of front and rear wheels. A fuel cut pattern determining unit is configured to determine a fuel cut pattern during a unit section depending on the target torque. A fuel cut control unit is configured to cut the fuel supply based on the fuel cut pattern. An average output torque predicting unit is configured to predict an average output torque of the engine during the unit section. A fuel cut pattern correcting unit is configured to correct the remaining fuel cut pattern during the unit section by judging the overage and shortage of generation of an output torque of the engine by comparison of the average output torque and the target torque.

A second embodiment of the present invention is that the average output torque predicting unit is configured to predict the average output torque by calculating the output torque, which is generated by the fuel cut pattern already performed during the unit section, and the output torque, which is expected to be generated by the unperformed fuel cut pattern, and then by calculating the average of the calculated output torques.

A third embodiment of the present invention is that the average output torque predicting unit is configured to calculate the output torque generated in each fuel injection process of each of the cylinders during the unit section, respectively. The output torque calculated in each fuel injection process of each of the cylinders is the output torque calculated by an engine speed and a throttle opening at the time of fuel injection of the cylinders in the fuel injection process of the cylinders which injected the fuel during the unit section, is the output torque calculated by the engine speed and the throttle opening at the prediction timing in the fuel injection process of the cylinders which are scheduled to inject the fuel during the unit section, and is a friction torque, in the fuel injection process of the cylinders, to which the fuel supply is cut during the unit section, and the cylinders which are scheduled to cut the fuel supply.

A fourth embodiment of the present invention is that there are included a friction torque estimating unit which is configured to estimate the friction torque of the engine and an output torque estimating unit configured to estimate the output torque of the engine. The fuel cut pattern determining unit is configured to determine the fuel cut pattern by comparing the ratio of the difference between a target torque and the friction torque, and the difference between the output torque and the friction torque.

A fifth embodiment of the present invention is such that the unit section is the section including the fuel injection process which is a positive even multiple of the number of cylinders the engine has. The average output torque predicting unit is configured to predict the average output torque at the stage in which the majority of the unit section ends.

According to the first embodiment of the present invention, in the middle of the unit section of the fuel cut pattern, the average output torque of the engine during the unit section is calculated, and the remaining fuel cut pattern during the unit section is corrected by comparison of the average output torque and the target torque. Accordingly, only the fuel cut pattern is corrected without changing the target torque during the unit section, which thereby improves the convergence of the output torque of the engine with respect to the target torque.

According to the second embodiment of the present invention, taking the fuel cut already performed in the fuel cut pattern during the unit section into consideration, the subsequent fuel cut pattern is corrected, which thereby makes it easier to converge the output torque of the engine into the target torque. In addition, taking the already-performed fuel cut into consideration, the subsequent fuel cut pattern is corrected, which thereby makes it easier to converge the output torque of the engine into the target torque, even if the rider operates the throttle grip during the unit section of the fuel cut pattern.

According to the third embodiment of the present invention, the output torque which is calculated in response to the fuel injection process of each of the cylinders is the output torque calculated by the engine speed and the throttle opening at the time of fuel injection of the cylinders in the fuel injection process of the cylinders which injected the fuel during the unit section, is the output torque calculated by the engine speed and the throttle opening at the prediction timing in the fuel injection process of the cylinders which are scheduled to inject the fuel during the unit section, and is the friction torque in the fuel injection process of the cylinders, to which the fuel supply is cut during the unit section, and the cylinders which are scheduled to cut the fuel supply during the unit section. Consequently, it is possible to precisely predict the average output torque which is generated during the unit section of the fuel cut pattern, and to precisely correct the fuel cut pattern by comparison of the average output torque and the target torque.

According to the fourth embodiment of the present invention, taking the friction torque into consideration, the ratio of the target torque to the output torque is evaluated, which thereby can determine the optimum fuel cut pattern for the convergence into the target torque.

According to the fifth embodiment of the present invention, the unit section is the section including the fuel injection process which is a positive even multiple of the number of cylinders the engine has, and the average output torque predicting means predicts the average output torque at the stage in which the majority of the unit section ends, which thereby can improve the convergence with respect to the target torque.

BRIEF DESCRIPTION OF THE DRAWINGS

FIG. 2 is a diagram showing an example of a fuel cut pattern map stored in a memory portion of FIG. 1.

FIG. 6 is a diagram showing the fuel cut pattern which is corrected multiple times.

DETAILED DESCRIPTION

Embodiments of a vehicle and a traction control system for a vehicle according to the present invention will be described in detail hereinafter with reference to the accompanying drawings.

Figure 1:
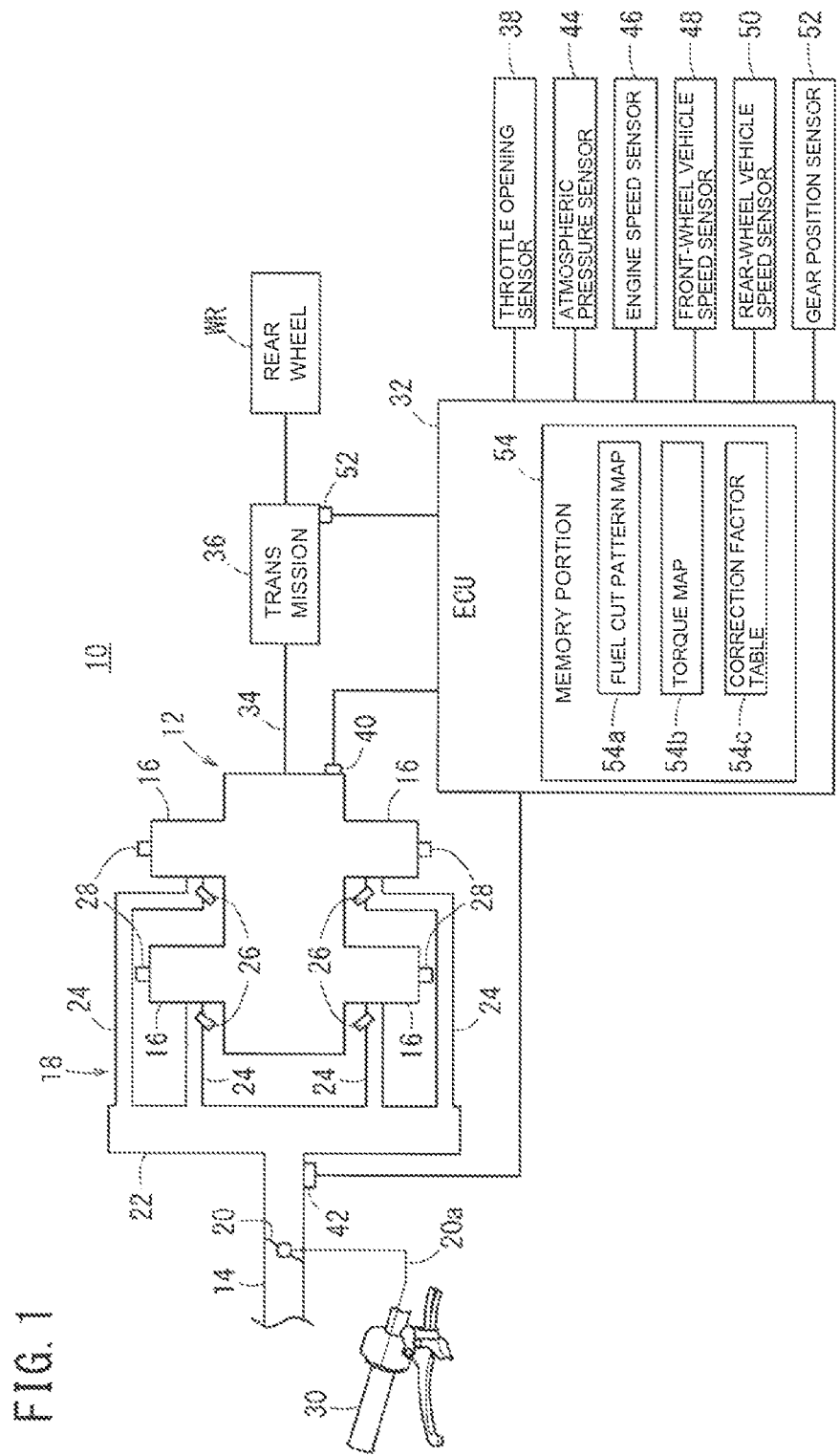
FIG. 1 is an electric schematic configuration diagram of a traction control system for a vehicle mounted on a motorcycle.

FIG. 1 is the electric schematic configuration diagram of a traction control system 10 for a vehicle mounted on, in this example, a motorcycle.

A vehicle can have a four-cylinder engine 12, a main intake pipe 14, the upstream side of which a not-shown air cleaner is connected to, and an intake manifold 18 which connects the main intake pipe 14 and each of the cylinders 16 of the engine 12. The main intake pipe 14 is provided with a throttle valve 20 for adjusting the amount of air which is taken in the engine 12. The intake manifold 18 has a surge tank 22 and a plurality of sub-intake pipes 24, and the plurality of sub-intake pipes 24 are connected to a not-shown combustion chamber of each of the cylinders 16.

Each of the sub-intake pipes 24 is provided with a fuel injection equipment (injector) 26 corresponding to each of the cylinders 16, and the fuel injection equipment 26 generates the air-fuel mixture by injecting the fuel to the air which is taken in via the throttle valve 20. More specifically, the fuel injection equipment 26 generates the air-fuel mixture which is taken in the corresponding cylinder 16. The generated air-fuel mixture flows into the combustion chamber of each of the cylinders. Each of the cylinders 16 is provided with a spark plug (ignition system) 28 for igniting the air-fuel mixture which is taken in the combustion chamber of each of the cylinders 16. The air-fuel mixture is burned in such a way to be ignited by the spark plug 28, and the engine 12 outputs by converting the fuel energy into the rotational driving force.

The throttle valve 20 is connected to the throttle grip 30 of the motorcycle with a wire 20a, and an opening θ (throttle opening θ) of the throttle valve 20 is changed depending on the opening operation of the throttle grip 30 by the wire 20a. The larger the opening of the throttle grip 30 is, the larger the throttle opening θ becomes. Further, the larger the throttle opening θ is, the more the amount of air supplied to the engine 12 increases.

The fuel injection which is generated by the fuel injection equipment 26, and the ignition which is generated by the spark plug 28, is controlled by ECU 32.

A crankshaft 34 which is the output shaft of the engine 12 is connected to a rear wheel WR of the motorcycle via a transmission 36. The transmission 36 changes the transmission gear ratio (reduction ratio) of the transferred rotational force, and then transfers it to the rear wheel WR. The transmission 36 has a plurality of not-shown speed transmission gear sets (for example, a first, second, third and fourth transmission gear sets and the like), and the speed transmission gear set changes depending on the shift operation of the rider. The speed transmission gear set which is smaller in number is higher in the transmission gear ratio while the speed transmission gear set which is larger in number is lower in the transmission gear ratio.

The traction control system 10 for the vehicle can have a throttle opening sensor 38 for detecting the throttle opening θ. A water temperature sensor 40 can detect the temperature of not-shown cooling water (water temperature) TW of the engine 12. An intake air temperature sensor 42 can detect the air temperature (intake air temperature) TA which is taken in the engine 12. An atmospheric pressure sensor 44 for detecting an atmospheric pressure PA. An engine speed sensor 46 can detect a rotational speed (engine speed) NE of the crankshaft 34 of the engine 12. A front-wheel vehicle speed sensor 48 can detect a vehicle speed Vf of a not-shown front wheel of the motorcycle. A rear-wheel vehicle speed sensor 50 can detect a vehicle speed Vr of the rear wheel WR. A gear position sensor 52 can detect the present speed transmission gear (gear position) of the transmission 36. The signals which are detected by the throttle opening sensor 38, the water temperature sensor 40, the intake air temperature sensor 42, the atmospheric pressure sensor 44, the engine speed sensor 46, the front-wheel vehicle speed sensor 48, the rear-wheel vehicle speed sensor 50 and the gear position sensor 52 are transferred to the ECU 32.

The ECU 32 has a memory portion 54 which stores the necessary program and data for controlling the ECU 32 and is used also as the working memory of the ECU 32. The memory portion 54 stores, in particular, a fuel cut pattern map 54a, a torque map 54b and a correction factor table 54c. The correction factor table 54c stores a water temperature correction factor k1 based on the water temperature TW, an intake air temperature correction factor k2 based on the intake air temperature TA, and an atmospheric pressure correction factor k3 based on the atmospheric pressure PA.

FIG. 2 is the diagram showing an example of the fuel cut pattern map 54a stored in the memory portion 54. The fuel cut pattern map 54a stores the fuel cut patterns of 15 types of unit sections. The fuel cut pattern is treated in a set of 16-time fuel injection processes. For convenience, four cylinders 16 are shown as the cylinder #1, the cylinder #2, the cylinder #3 and the cylinder #4, and the fuel injection processes are performed in order of the cylinder #4, the cylinder #1→the cylinder #3→the cylinder #2. In the present embodiment, the cylinder #4 is explained as a cylinder 16 for starting thinning out (traction control start).

White and black circles shown in FIG. 2 show the fuel injection processes of the fuel cut pattern: the white circle shows that the fuel is injected in the fuel injection process, and the black circle shows that the fuel supply is cut in the fuel injection process. For example, the fuel cut pattern with No. '1' does not inject the fuel (cuts the fuel supply) to the cylinder #4 which is the cylinder 16 of the first fuel injection process, and shows that the fuel is injected to all of the remaining second to sixteenth fuel injection processes for the cylinder 16.

Figure 3:
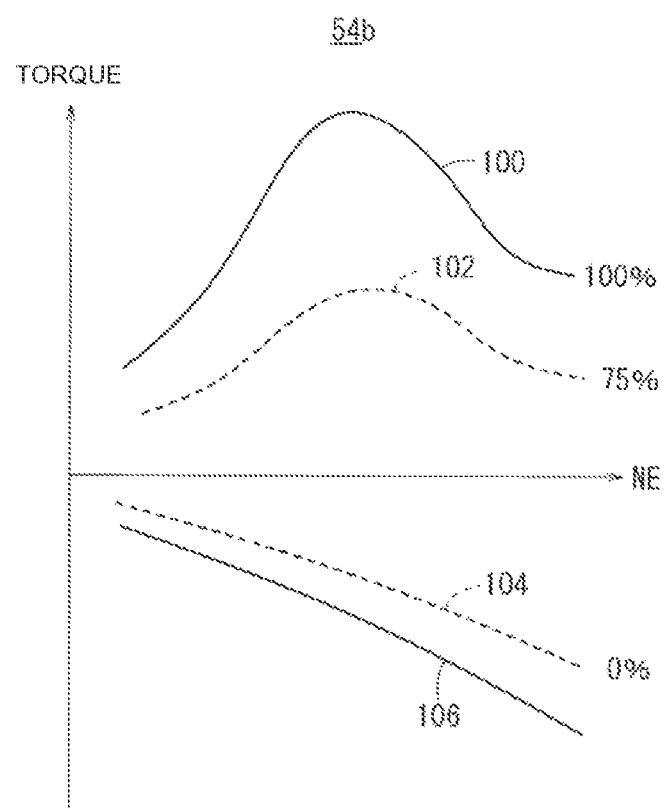
FIG. 3 is a diagram showing an example of a torque map stored in a memory portion of FIG. 1.

FIG. 3 is the diagram showing an example of a torque map 54b stored in a memory portion 54 of FIG. 1. As shown in FIG. 3, a base engine torque Tb based on an engine speed NE and a friction torque Tf are defined in the torque map 54b. The base engine torque Tb is the torque of the engine 12 which is estimated from the engine speed NE and the throttle opening θ on the assumption that the fuel supply is not cut. The friction torque Tf is the torque of the engine 12, which is the output torque generated by the engine when the fuel supply is cut, on the assumption that the fuel supply to all is cut.

Curves 100, 102, and 104 show the base engine torque Tb, and a curve 106 shows the friction torque Tf. The curve 100 shows the base engine torque Tb when the throttle opening θ is 100%, the curve 102 shows the base engine torque Tb when the throttle opening θ is 75%, and the curve 104 shows the base engine torque Tb when the throttle opening θ is 0%.

The throttle opening θ of 100% means that the ratio of the present throttle opening θ is 100% with reference to the full (maximum) throttle opening θ MAX. Similarly, throttle opening θ of 75%, 0% means that the ratio of the present throttle opening θ is 75%, 0%, respectively, with reference to the full throttle opening θ MAX. For convenience, FIG. 3 shows only the base engine torque Tb in the case in which the ratio of the present throttle opening θ is 100%, 75% and 0% with reference to the full throttle opening θ MAX. However, the base engine torque Tb depending on the degree of each throttle opening θ is defined for the torque map 54b.

The base engine torque Tb is estimated by the degree of the throttle opening θ and the engine speed NE, and the friction torque Tf is estimated by the engine speed NE. It is possible with experiments and the like in advance to evaluate the base engine torque Tb depending on the engine speed NE of each throttle opening θ and the friction torque Tf depending on the engine speed NE.

The ECU 32 can be an information processing unit (computer) including CPU, and function as the ECU 32 of the present embodiment in such a way that the information processing unit runs the program stored in the memory portion 54.

Figure 4:
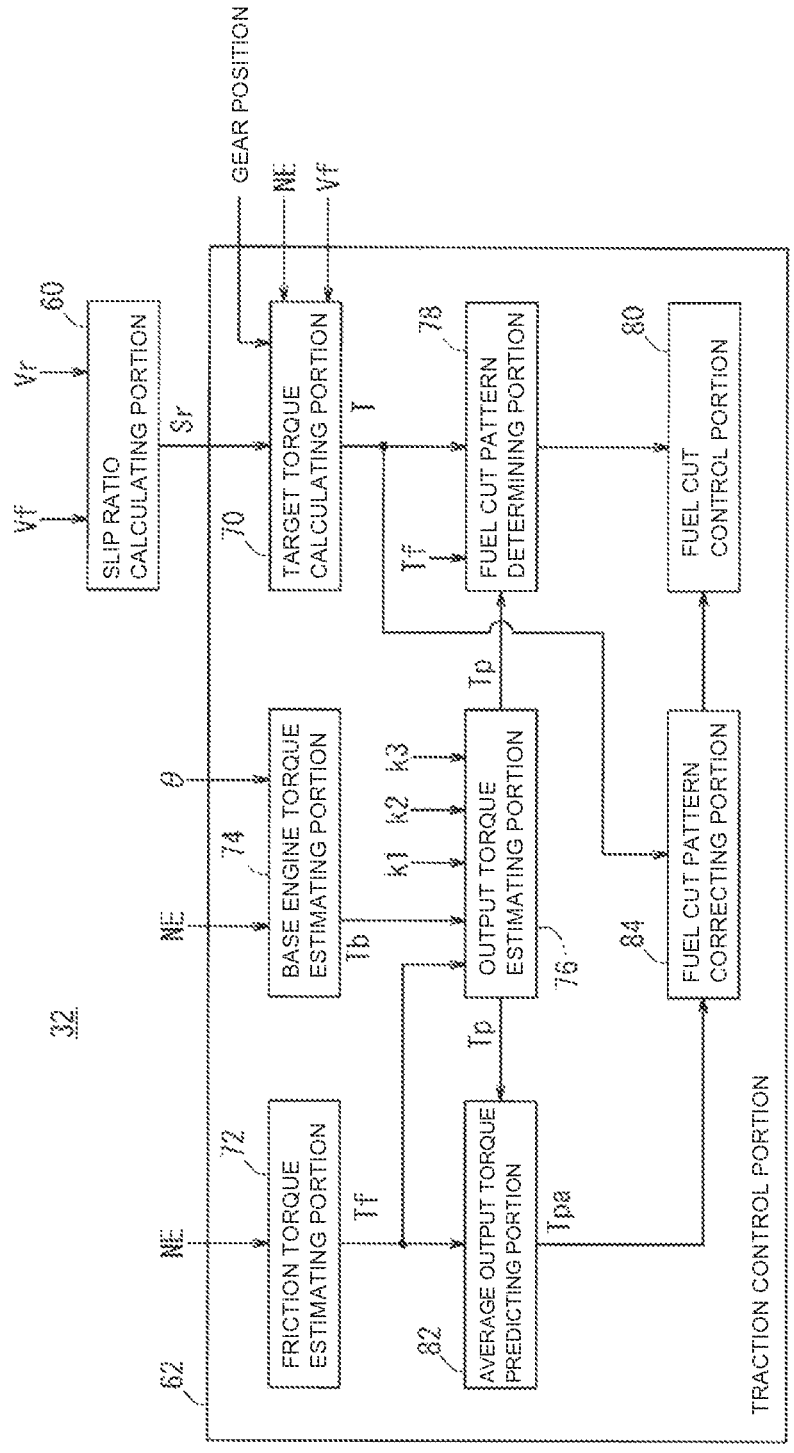
FIG. 4 is a functional block diagram of an ECU shown in FIG. 1.

FIG. 4 is the functional block diagram of the ECU 32. ECU 32 comprises a slip ratio calculating unit or portion 60 and a traction control unit or portion 62. The traction control portion 62 has a target torque calculating unit or portion 70, a friction torque estimating unit or portion 72, a base engine torque estimating unit or portion 74, a output torque estimating unit or portion 76, a fuel cut pattern determining unit or portion 78, a fuel cut control unit or portion 80, an average output torque predicting unit or portion 82 and a fuel cut pattern correcting unit or portion 84.

The slip ratio calculating portion 60, which can be a slip ratio calculating means calculates an actual slip ratio Sr of front and rear wheels (actual slip ratio) of the motorcycle based on the present vehicle speed Vf of the front wheel, which is detected by the front-wheel vehicle speed sensor 48, and on the present vehicle speed Vr of the rear wheel WR, which is detected by the rear-wheel vehicle speed sensor 50. Although the calculation of the actual slip ratio Sr is the well-known art, the actual slip ratio Sr may be calculated, for example, with the relational formula: the actual slip ratio Sr=(the vehicle speed Vr of the rear wheel WR−the vehicle speed Vf of the front wheel)/(the vehicle speed Vf of the front wheel). In this case, the actual slip ratio Sr may be evaluated after correcting the vehicle speed Vf, Vr which are detected by the front-wheel vehicle speed sensor 48 and the rear-wheel vehicle speed sensor 50.

The traction control portion 62 judges whether the actual slip ratio Sr is larger than the threshold value or not, and starts the traction control if the actual slip ratio Sr is larger than the threshold value. The traction control calculates a target torque T by using the PID (Proportional-Integral-Derivative) control, which is a kind of the feedback control, so that the actual slip ratio Sr becomes a predetermined target slip ratio St, and determines the fuel injection cut pattern. Then, the traction control cuts the fuel supply so that the output torque Tp of the engine 12 approaches the target torque T, and converges the slip. When the traction control portion 62 starts the traction control, the target torque calculating portion 70, the friction torque estimating portion 72, the base engine torque estimating portion 74, the output torque estimating portion 76, the fuel cut pattern determining portion 78, the fuel cut control portion 80, the average output torque predicting portion 82 and the fuel cut pattern correcting portion 84 perform the operations as described below. Incidentally, when the actual slip ratio Sr is lower than the threshold value, the traction control portion 62 ends the traction control.

The target torque calculating portion 70, which can be a target torque calculating means, calculates the target torque T by using the PID control. The target torque T is calculated by evaluating the deviation of the actual slip ratio Sr from the predetermined target slip ratio St, and based on the deviation by using the PID control. In this case, the target torque calculating portion 70 calculates the target torque T, taking into consideration the engine speed NE, which is detected by the engine speed sensor 46, and vehicle speed Vf of the front wheel, which is detected by the front-wheel vehicle speed sensor 48 and the gear position which is detected by the gear position sensor 52.

The friction torque estimating portion 72, which can be a friction torque estimating means, estimates the friction torque Tf by acquiring the friction torque Tf depending on the engine speed NE, which is detected by the engine speed sensor 46 at the time of fuel injection process of the cylinder 16, from the torque map 54b.

The base engine torque estimating portion 74, which can be a base engine torque estimating means estimates the base engine torque Tb by acquiring the base engine torque Tb depending on the throttle opening θ, which is detected by the throttle opening sensor 38 at the time of fuel injection process of the cylinder 16, and depending on the engine speed NE, which is detected by the engine speed sensor 46, from the torque map 54b.

The output torque estimating portion 76, which can be an output torque estimating means estimates the output torque Tp of the engine 12 with the relational formula: the output torque Tp of the engine 12=(the base engine torque Tb−the friction torque Tf)×the water temperature correction factor k1×the intake air temperature correction factor k2×the atmospheric pressure correction factor k3+the friction torque Tf.

The base engine torque Tb is estimated by the base engine torque estimating portion 74, and the friction torque Tf is estimated by the friction torque estimating portion 72. In addition, the water temperature correction factor k1 is a correction factor which the output torque estimating portion 76 evaluates from the correction factor table 54c depending on the water temperature TW detected by the water temperature sensor 40. The intake air temperature correction factor k2 is a correction factor which the output torque estimating portion 76 evaluates from the correction factor table 54c depending on the present intake air temperature TA detected by the intake air temperature sensor 42. The atmospheric pressure correction factor k3 is a correction factor which the output torque estimating portion 76 acquires from the correction factor table 54c depending on the atmospheric pressure PA detected by the atmospheric pressure sensor 44.

The fuel cut pattern determining portion 78, which can be a fuel cut pattern determining means, determines the fuel cut pattern to be used based on the target torque T and the output torque Tp. More specifically, the fuel cut pattern determining portion 78 evaluates a torque ratio based on the target torque T and the output torque Tp, and determines the fuel cut pattern depending on the evaluated torque ratio out of the fuel cut pattern map 54a. The torque ratio can be evaluated with the relational formula: the torque ratio=(the target torque T−the friction torque Tf)/(the output torque Tp−the friction torque Tf). When the value of the torque ratio is smaller, the actual slip ratio Sr becomes larger than the target slip ratio St. Therefore, in order to strengthen the traction control, the fuel cut pattern with a bigger number is determined as a fuel cut pattern to be used.

Here, the ratio of the value is acquired by deducting the friction torque Tf from the target torque T and the output torque Tp. This is because it is necessary to determine the ratio to cut the fuel supply based on the output torque if all of the fuel supply during the unit section is cut when determining the fuel cut pattern.

The fuel cut control portion 80, which can be a fuel cut control means, cuts the fuel supply based on the fuel cut pattern during the unit section which is determined by the fuel cut pattern determining portion 78. For example, the fuel cut pattern with No. '4' is determined, the fuel supply is cut to the cylinder #4, which is the cylinder 16 of the first, fifth, ninth, and thirteenth fuel injection processes, while the fuel is injected to the cylinders #1 to #3, which is the cylinder 16 of the second to fourth, sixth to eighth, tenth to twelfth, fourteenth to sixteenth fuel injection processes.

Figure 5:
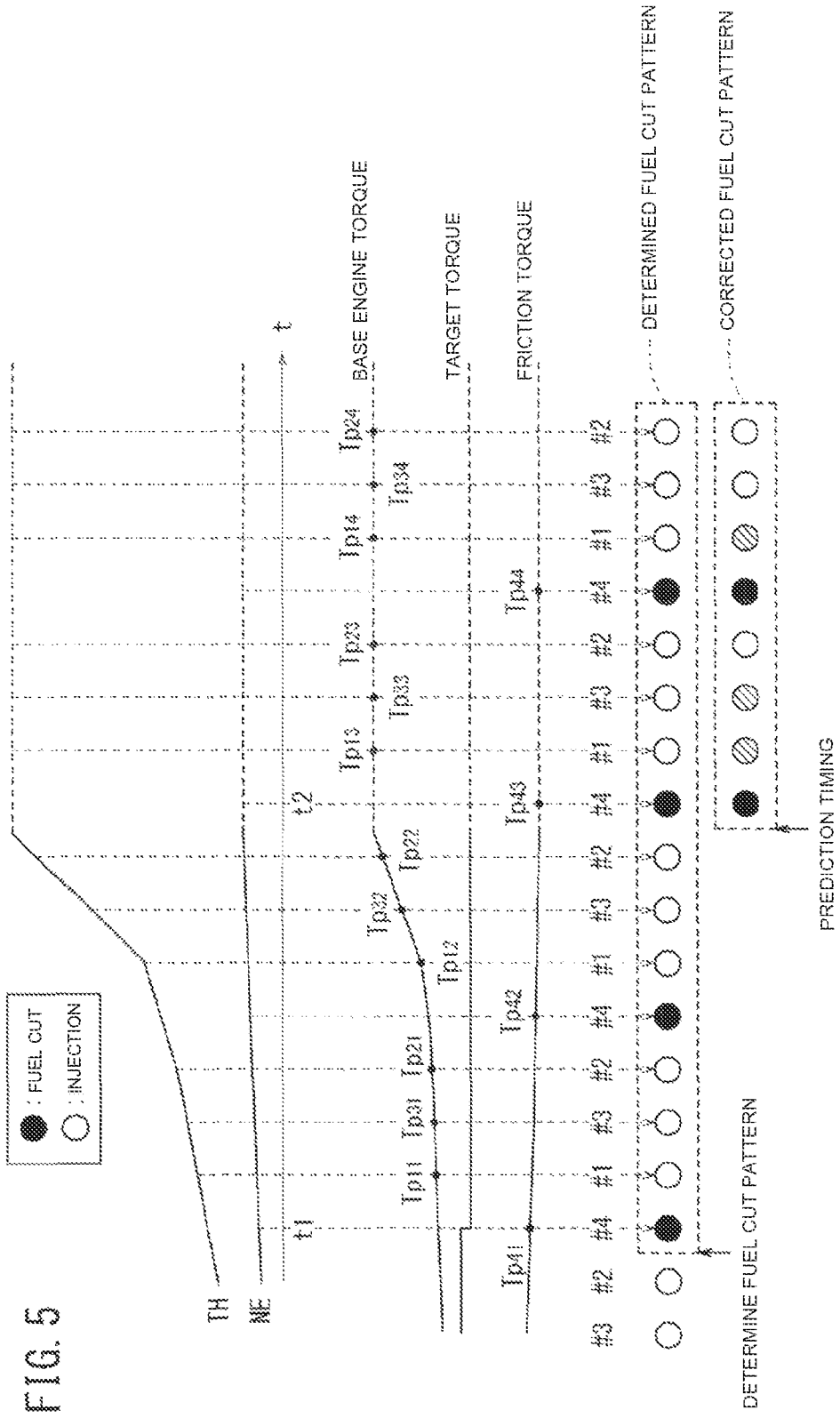
FIG. 5 is a diagram showing an example of the cylinders, to which the fuel supply is cut based on the fuel cut pattern during a unit section, and the change of a base engine torque, a friction torque, an engine speed, and a throttle opening of the engine during the unit section.

FIG. 5 is the diagram showing an example of the cylinders 16, to which the fuel supply is cut based on the fuel cut pattern during the unit section, and the change of the base engine torque Tb, the friction torque Tf, the engine speed NE, and the throttle opening θ of the engine 12 during the unit section.

In FIG. 5, after the fuel injection process of the cylinder #2 ends, the actual slip ratio Sr is judged to be larger than the threshold value and the traction control is started. Therefore, the cylinder 16 in which the first fuel injection process is performed is the cylinder #4, and the fuel injection process of the cylinder #4 is the first fuel injection process of the fuel cut pattern. Accordingly, the fuel cut control portion 80 cuts the fuel supply in the fuel injection process of the cylinder #4, that is, prohibits the fuel injection by the fuel injection equipment 26 corresponding to the cylinder #4. Next, since the fuel injection process of the cylinder #1 is the second fuel injection process of the fuel cut pattern, the fuel injection equipment 26 corresponding to the cylinder #1 injects the fuel in the fuel injection process of the cylinder #1. Then, since the fuel injection process of the cylinder #3 is the third fuel injection process of the fuel cut pattern, the fuel injection equipment 26 corresponding to the cylinder #3 injects the fuel in the fuel injection process of the cylinder #3. In this way, the fuel cut control portion 80 cuts the fuel supply based on the fuel cut pattern.

Referring back to the explanation of FIG. 4, the average output torque predicting portion 82, which can be an average output torque predicting means, predicts an average output torque Tpa of the engine 12 at the end of unit section of the fuel cut pattern when the half of the unit section ends (at the prediction timing), that is, at the stage in which the half (eight sets) of the fuel injection process. More specifically, the average output torque predicting portion 82 calculates the output torque Tp, which is generated by the fuel cut pattern (the former half in the unit section) already performed during the unit section, and the output torque Tp, which is expected to be generated by the unperformed fuel cut pattern (the latter half in the unit section), and predicts the average output torque Tpa of the engine 12 at the end of the unit section by calculating the average of these output torques Tp.

Hereinafter, the calculation of the average output torque Tpa will be described with reference to FIG. 5. Incidentally, in FIG. 5, the throttle opening θ and the engine speed NE increase because the opening operation of the throttle grip 30 is performed during the unit section of the fuel cut pattern, and accordingly the output torque Tp of the engine 12 also increases.

As shown in FIG. 5, since the fuel supply is cut to the fuel injection process of the cylinder #4 which is the first fuel injection process of the fuel cut pattern, the average output torque predicting portion 82 uses the friction torque Tf, which the friction torque estimating portion 72 calculated (estimated) at the time of the fuel injection process of the cylinder #4, as the output torque Tp at the time of the first fuel injection process. For convenience, the output torque Tp is called the output torque $Tp_{41}$. Since the fuel supply is not cut to the fuel injection process of the cylinder #1 which is the second fuel injection process of the fuel cut pattern, the average output torque predicting portion 82 uses the output torque Tp, which the output torque estimating portion 76 calculated (estimated) at the time of the fuel injection process of the cylinder #1 by using the base engine torque Tb, as the output torque Tp at the time of the second fuel injection process. For convenience, the output torque Tp is called the output torque $Tp_n$.

Since the fuel supply is not cut to the fuel injection process of the cylinder #3 which is the third fuel injection process of the fuel cut pattern, the average output torque predicting portion 82 uses the output torque Tp, which the output torque estimating portion 76 calculated (estimated) at the time of the fuel injection process of the cylinder #3 by using the base engine torque Tb, as the output torque Tp at the time of the third fuel injection process. For convenience, the output torque Tp is called the output torque $Tp_{31}$. Since the fuel supply is not cut to the fuel injection process of the cylinder #2 which is the fourth fuel injection process of the fuel cut pattern, the average output torque predicting portion 82 uses the output torque Tp, which the output torque estimating portion 76 calculated (estimated) at the time of the fuel injection process of the cylinder #2 by using the base engine torque Tb, as the output torque Tp at the time of the fourth fuel injection process. For convenience, the output torque Tp is called the output torque $Tp_{21}$.

In addition, since the fuel supply is cut to the fuel injection process of the cylinder #4 which is the fifth fuel injection process of the fuel cut pattern, the average output torque predicting portion 82 uses the friction torque Tf, which the friction torque estimating portion 72 calculated (estimated) at the time of the fuel injection process of the cylinder #4, as the output torque Tp at the time of the fifth fuel injection process. For convenience, the output torque Tp is called the output torque $Tp_{42}$. Since the fuel supply is not cut to the fuel injection processes of the cylinder #1, the cylinder #3, the cylinder #2 which are the sixth, seventh and eighth fuel injection processes of the fuel cut pattern, the average output torque predicting portion 82 uses the output torque Tp, which the output torque estimating portion 76 calculated (estimated) at the time of the fuel injection processes of the cylinder #1, the cylinder #3, the cylinder #2, as the output torque Tp at the time of the sixth, seventh and eighth fuel injection processes. For convenience, the output torques Tp which are calculated at the time of the sixth, seventh and eighth fuel injection processes are called the output torques $Tp_{12}$, $Tp_{32}$, $Tp_{22}$.

Since neither the fuel injection nor the fuel cut is actually performed in the ninth and subsequent fuel injection processes of the fuel cut pattern, the average output torque predicting portion 82 uses the friction torque Tf, which the friction torque estimating portion 72 estimated at the prediction timing, as the output torque Tp at the time of the ninth and thirteenth fuel injection processes to which the fuel supply is scheduled to be cut.

Further, the average output torque predicting portion 82 uses the output torque Tp, which the output torque estimating portion 76 estimated using the base engine torque Tb at the prediction timing as the output torque Tp at the time of the tenth, eleventh, twelfth, fourteenth, fifteenth and sixteenth fuel injection processes to which the fuel supply is scheduled not to be cut (the fuel is scheduled to be injected). For convenience, the output torques Tp which correspond to the ninth to sixteenth fuel injection processes are called the output torques $Tp_{43}$, $Tp_{13}$, $Tp_{33}$, $Tp_{23}$, $Tp_{44}$, $T_{14}$, $Tp_{34}$, $Tp_{24}$.

The average output torque predicting portion 82 calculates (estimates) the average output torque Tpa during the unit section of the fuel cut pattern from the output torque Tp, for which the fuel cut pattern ends, and from the output torque Tp which is expected to generate in the subsequently-scheduled fuel cut pattern. More specifically, the average output torque Tpa is calculated with the relational formula: the average output torque $Tpa=(Tp_{41}+T_{11}+Tp_{31}+Tp_{21}+Tp_{42}+Tp_{12}+Tp_{32}+Tp_{22}+Tp_{43}+Tp_{13}+Tp_{33}+Tp_{23}+Tp_{44}+Tp_{14}+Tp_{34}+Tp_{24})/16$.

Referring back to the explanation of FIG. 4, the fuel cut pattern correcting portion 84 judges the overage and shortage of generation of the output torque Tp by comparing the target torque T with the average output torque Tpa at the end of the unit section of the calculated fuel cut pattern, and then corrects the determined fuel cut pattern of the remaining half of the unit section depending on the difference between the average output torque Tpa and the target torque T. For example, when the average output torque Tpa is judged to be larger than the target torque T, the remaining half of the fuel cut pattern is corrected by increasing the number of the fuel cut, which is shown by the remaining half of the fuel cut pattern, depending on the difference between the average output torque Tpa and the target torque T. Consequently, it is possible to make the average output torque Tpa substantially the same as the target torque T.

In the example of the fuel cut pattern after the correction shown in FIG. 5, the fuel cut pattern is corrected so as to cut the fuel supply in the tenth, eleventh and fourteenth fuel injection processes of the fuel cut pattern. In FIG. 5, a diagonal line is added to the circle for showing the fuel injection process in which the fuel cut added by the correction is performed.

Then, the fuel cut control portion 80 continues the traction control by cutting the fuel supply based on the fuel cut pattern of the remaining half of the corrected unit section. To explain with reference to FIG. 5, the fuel cut control portion 80 cuts the fuel supply in the fuel injection process of the cylinder #4, which is the ninth fuel injection process of the fuel cut pattern, in the fuel injection process of the cylinder #1, which is the tenth fuel injection process of the fuel cut pattern, in the fuel injection process of the cylinder #3, which is the eleventh fuel injection process of the fuel cut pattern, in the fuel injection process of the cylinder #4, which is the thirteenth fuel injection process of the fuel cut pattern, and in the fuel injection process of the cylinder #1, which is the fourteenth fuel injection process of the fuel cut pattern.

Therefore, from the time point when the target torque T is calculated, the throttle opening θ and the engine speed NE increase because the opening operation of the throttle grip 30 is performed. Accordingly, even if the output torque Tp of the engine 12 also increases, it is possible to approach the output torque Tp to the target torque T, which thereby improves the precision of the traction control and improves the convergence of the output torque Tp of the engine 12 with respect to the target torque T.

The traction control portion 62 ends the traction control when the actual slip ratio Sr, which is calculated by the slip ratio calculating portion 60, is not more than the threshold value, after the fuel supply is cut based on the fuel cut pattern. When the actual slip ratio Sr, which is calculated by the slip ratio calculating portion 60, is still larger than the threshold value, the traction control portion calculates the target torque T again, determines the fuel injection cut pattern, cuts the fuel supply so that the output torque Tp of the engine 12 approaches the target torque T, and converges the slip.

Incidentally, although the determined fuel cut pattern is corrected once in the above-mentioned embodiment, the fuel cut pattern may be corrected multiple times. FIG. 6 is the diagram showing the fuel cut pattern which is corrected multiple times. As described above, the fuel cut pattern, which is corrected by comparing the target torque T and the average output torque Tpa at the end of the unit section of the fuel cut pattern predicted when the half of the unit section ends (at the first prediction timing), is corrected. And after that, the corrected fuel cut pattern is further corrected by comparing the target torque T and the average output torque Tpa at the end of the unit section of the fuel cut pattern which is predicted again at the new prediction timing (at the second prediction timing). In the example in FIG. 6, the second prediction timing is treated at the stage in which the tenth fuel injection process ends, and the fuel cut is further added in the cylinder #2, which is the twelfth fuel injection process, by the second correction of fuel cut pattern. The fuel cut pattern is corrected multiple times like this, which thereby improves the precision of the traction control and improves the convergence of the output torque Tp of the engine 12 with respect to the target torque T. Incidentally, in FIG. 6, a diagonal line is added to the circle for showing the fuel injection process in which the fuel cut added by the correction is performed.

Although a set of the fuel cut pattern is such that the fuel injection process is four times as the number of the cylinders 16 the engine 12 has (the number of cylinders of the engine 12), a set of the fuel cut pattern may be such that the fuel injection process is two times, or six times as the number of the cylinders 16 of the engine 12. That is, it is only necessary that a set of the fuel injection process is a positive even multiple of the number of cylinders of the engine 12.

In addition, although in the above-mentioned embodiment the average output torque predicting portion 82 predicts the average output torque Tpa during the unit section at the stage in which the half of the unit section of the fuel cut pattern ends, if it is in the middle of the unit section of the fuel cut pattern, it may not be the stage in which the half of the unit section of the fuel cut pattern ends. For example, the average output torque predicting portion may predict the average output torque Tpa during the unit section when ⅓ or ⅔ of the unit section of the fuel cut pattern ends. In this case, a set of fuel cut pattern may be such that the fuel injection process is a positive integer multiple of the number of cylinders of the engine 12.

In addition, in the above-mentioned embodiment, the average output torque predicting portion 82 predicts the average output torque Tpa by using the friction torque Tf, which is estimated by the friction torque estimating portion 72, and the output torque Tp which is estimated by the output torque estimating portion 76. However, the average output torque predicting portion 82 may predict the average output torque Tpa by directly calculating the friction torque Tf and the output torque Tp corresponding to the fuel injection process of each of the cylinders 16.

As just described, the traction control system 10 for the vehicle of the present invention calculates the average output torque Tpa of the engine 12 during the unit section, in the middle of the unit section of the fuel cut pattern, that is, during performing the fuel cut based on the fuel cut pattern and corrects the remaining fuel cut pattern during the unit section by calculating the average output torque Tpa of the engine 12 and by comparison of the average output torque Tpa and the target torque T. Accordingly, only the fuel cut pattern is corrected without changing the target torque T during the unit section, which thereby improves the convergence of the output torque Tp of the engine 12 with respect to the target torque T.

In addition, taking the fuel cut already performed in the fuel cut pattern during the unit section into consideration, the subsequent fuel cut pattern is corrected, which thereby makes it easier to converge the output torque Tp of the engine 12 into the target torque T. Further, taking the already-performed fuel cut into consideration, the subsequent fuel cut pattern is corrected, which thereby makes it easier to converge the output torque Tp of the engine 12 into the target torque T, even if the rider operates the throttle grip 30 during the unit section of the fuel cut pattern.

The output torque Tp which is calculated in response to the fuel injection process of each of the cylinders 16 is the output torque Tp calculated by the engine speed NE and the throttle opening θ at the time of fuel injection of the cylinders 16 in the fuel injection process of the cylinders 16 which injected the fuel during the unit section, is the output torque Tp calculated by the engine speed NE and the throttle opening θ at the prediction timing in the fuel injection process of the cylinders 16 which are scheduled to inject the fuel during the unit section, and is the friction torque Tf in the fuel injection process of the cylinders 16, to which the fuel supply is cut during the unit section, and the cylinders 16 which are scheduled to cut the fuel supply during the unit section. Consequently, it is possible to precisely predict the average output torque Tpa which is generated during the unit section of the fuel cut pattern, and to precisely correct the fuel cut pattern by comparison of the average output torque Tpa and the target torque T.

Taking the friction torque Tf into consideration, the torque ratio of the target torque T to the output torque Tp is evaluated which thereby can determine the optimum fuel cut pattern for the convergence into the target torque T.

The unit section is the section including the fuel injection process which is a positive even multiple of the number of cylinders of the engine 12, and predicts the average output torque Tpa at the stage in which the majority of the unit section ends.

Accordingly, it is possible to improve the convergence with respect to the target torque T.

The present invention has been described as above with reference to the preferred embodiment, but the technical scope of the present invention is not limited to the scope described in the above-mentioned embodiment. It is apparent to a person skilled in the art that various modifications and improvements can be made to the above-mentioned embodiment. It is apparent from the description of the claims that the embodiment to which the various modifications and improvements can be added is included in the technical scope of the present invention. In addition, the reference numerals in parenthesis included in the scope of claims are affixed in accordance with the reference numerals in the accompanying drawings for facilitating the understanding of the present invention, but the interpretation of the present invention is not limited to the elements with the reference numerals.

DESCRIPTION OF REFERENCE NUMERALS

10 . . . traction control system for a vehicle
12 . . . engine
14 . . . main intake pipe
16 . . . cylinder
18 . . . intake manifold
20 . . . throttle valve
22 . . . surge tank
24 . . . sub-intake pipe
26 . . . fuel injection equipment
28 . . . spark plug
30 . . . throttle grip
32 . . . ECU
34 . . . crankshaft
36 . . . transmission
38 . . . throttle opening sensor
40 . . . water temperature sensor
42 . . . intake air temperature sensor
44 . . . atmospheric pressure sensor
46 . . . engine speed sensor
48 . . . front-wheel vehicle speed sensor
50 . . . rear-wheel vehicle speed sensor
52 . . . gear position sensor
54 . . . memory portion
54$a$ . . . fuel cut pattern map
54$b$ . . . torque map
54$c$ . . . correction factor table
60 . . . slip ratio calculating portion
62 . . . traction control portion
70 . . . target torque calculating portion
72 . . . friction torque estimating portion
74 . . . base engine torque estimating portion
76 . . . output torque estimating portion
78 . . . fuel cut pattern determining portion
80 . . . fuel cut control portion
82 . . . average output torque predicting portion
84 . . . fuel cut pattern correcting portion

The invention claimed is:

1. A vehicle, comprising:
an engine which has a plurality of cylinders;
a slip ratio calculating unit configured to calculate an actual slip ratio of front and rear wheels;
a target torque calculating unit configured to calculate a target torque of said engine based on said actual slip ratio of front and rear wheels;
a fuel cut pattern determining unit configured to determine a fuel cut pattern during a unit section depending on said target torque;
a fuel cut control unit configured to cut the fuel supply based on said fuel cut pattern; and
a traction control system which, in the middle of said unit section, includes an average output torque predicting unit configured to predict an average output torque of said engine during said unit section, and a fuel cut pattern correcting unit configured to correct said remaining fuel cut pattern during said unit section by judging the overage and shortage of generation of an output torque of said engine by comparison of said average output torque and said target torque.

2. The vehicle according to claim 1, wherein said average output torque predicting unit is also configured to predict said average output torque by calculating said output torque, which is generated by said fuel cut pattern already performed during said unit section, and said output torque, which is expected to be generated by said unperformed fuel cut pattern, and then by calculating the average of said calculated output torques.

3. The vehicle according to claim 2, wherein said average output torque predicting unit is configured to calculate said output torque generated in each fuel injection process of each of said cylinders during said unit section, respectively, and wherein said output torque calculated in each fuel injection process of each of said cylinders is the output torque calculated by an engine speed and a throttle opening at the time of fuel injection of said cylinders in the fuel injection process of said cylinders which injected the fuel during said unit section, is the output torque calculated by said engine speed and said throttle opening at the prediction timing in the fuel injection process of said cylinders which are scheduled to inject the fuel during said unit section, and is a friction torque, in the fuel injection process of said cylinders, to which the fuel supply is cut during said unit section, and said cylinders which are scheduled to cut the fuel supply.

4. The vehicle according to claim 1, further comprising:
a friction torque estimating unit configured to estimate the friction torque of said engine, and
an output torque estimating unit configured to estimate said output torque of said engine,
wherein said fuel cut pattern determining unit is configured to determine said fuel cut pattern by comparing the ratio of the difference between said target torque and said friction torque, and the difference between said output torque and said friction torque.

5. The vehicle according to claim 1, wherein said unit section is the section including the fuel injection process which is a positive even multiple of a number of cylinders of said engine and wherein said average output torque predicting unit is configured to predict said average output torque at the stage in which the majority of said unit section ends.

6. A vehicle, comprising:
an engine which has a plurality of cylinders;
a slip ratio calculating means for calculating an actual slip ratio of front and rear wheels;
a target torque calculating means for calculating a target torque of said engine based on said actual slip ratio of front and rear wheels;
a fuel cut pattern determining means for determining a fuel cut pattern during a unit section depending on said target torque;
a fuel cut control unit means for cutting the fuel supply based on said fuel cut pattern; and a traction control system which, in the middle of said unit section, includes an average output torque predicting unit configured to predict an average output torque of said engine during said unit section, and a fuel cut pattern correcting unit means for correcting said remaining fuel cut pattern during said unit section by judging the overage and shortage of generation of an output torque of said engine by comparison of said average output torque and said target torque.

7. The vehicle according to claim 6, wherein said average output torque predicting means for predicting said average output torque by calculating said output torque, which is generated by said fuel cut pattern already performed during said unit section, and said output torque, which is expected to be generated by said unperformed fuel cut pattern, and then by calculating the average of said calculated output torques.

8. The vehicle according to claim 7, wherein said average output torque predicting means for calculating said output torque generated in each fuel injection process of each of said cylinders during said unit section, respectively, and wherein said output torque calculated in each fuel injection process of each of said cylinders is the output torque calculated by an engine speed and a throttle opening at the time of fuel injection of said cylinders in the fuel injection process of said cylinders which injected the fuel during said unit section, is the output torque calculated by said engine speed and said throttle opening at the prediction timing in the fuel injection process of said cylinders which are scheduled to inject the fuel during said unit section, and is a friction torque, in the fuel injection process of said cylinders, to which the fuel supply is cut during said unit section, and said cylinders which are scheduled to cut the fuel supply.

9. The vehicle according to claim 6, further comprising:
a friction torque estimating means for estimating the friction torque of said engine, and
an output torque estimating means for estimating said output torque of said engine,
wherein said fuel cut pattern determining means for determining said fuel cut pattern by comparing the ratio of the difference between said target torque and said friction torque, and the difference between said output torque and said friction torque.

10. The vehicle according to claim 6, wherein said unit section is the section including the fuel injection process which is a positive even multiple of a number of cylinders of said engine and wherein said average output torque predicting means for predicting said average output torque at the stage in which the majority of said unit section ends.

* * * * *